FIG. IA

INVENTORS
PETER W. BRATH,
RONALD A. SARBACH
& ROBERT D. SMITH

BY Hurvitz, Rose & Greene

ATTORNEYS

United States Patent Office 3,398,815
Patented Aug. 27, 1968

3,398,815
ELECTRICALLY CONTROLLED BRAKE SYSTEM FOR RAILWAY CARS
Peter W. Brath, Pittsburgh, Ronald A. Sarbach, Wilmerding, and Robert D. Smith, Irwin, Pa., assignors to Westinghouse Air Brake Company, Wilmerding, Pa., a corporation of Pennsylvania
Filed Sept. 14, 1966, Ser. No. 579,386
17 Claims. (Cl. 188—195)

ABSTRACT OF THE DISCLOSURE

A vehicle braking system controlled selectively by an application (A) and release (R) relay control means, in a current responsive "P" wire control means. The level of the control signal from either the A and R relay mode or the P-wire mode of operation is modulated by signal analogs of load on the vehicle and the degree of dynamic braking being applied, and is supplied to an error gain amplifier which in turn drives power amplifiers to provide power current to torque motor released spring-applied tread brakes. The degree of reduction from normal current energizing the torque motor determines the degree of brake application by the spring brakes. A "jog" circuitry means is provided for initiating operation of the torque motor to effect brake release.

---

The present system relates generally to vehicle braking systems, and more particularly to vehicle braking systems in which brake application or release and propulsion is accomplished by a common or single control signal, derived from one wire, the brakes being spring applied and torque motor released in response to control currents in the wire which subsist between two limits, and in which propulsion occurs for control current outside these limits.

Briefly describing a preferred embodiment of the invention, the system may operate in either of two alternative modes designated A and R mode and P wire mode. The letters A and R imply application and release. When in the A and R mode the operation is accomplished by two relays designated application (AR) and release (RR) relays. The P wire is a control wire running through a car or the cars of a train. Control of brakes in response to current in the P wire is continuous and proportional to current flow. When current magnitude ranges between zero and 0.5 ampere control is in the braking range. From 0.5 to 1 amperes control calls for propulsion. Zero currents indicate full brake application and one-half ampere current indicates full brake release, with full proportional control between these limits. A brake operating unit which responds to the control is isolated from the P wire by means of a transductor, namely a magnetic amplifier. This allows the brake operating unit to be grounded with respect to supply voltage without referencing the P wire to ground. As the P wire current increases, the P wire current saturates the core of the magnetic amplifier and thus reduces the inductive reactance of the secondary winding, which has an AC power supply, rectifying bridge and ohmic load in series therewith. Thus current flows in the secondary winding proportional to the magnitude of the current in the primary. When the P wire current has a magnitude of 0.5 ampere the ohmic load develops four volts so that the range of the magnetic amplifier output is zero to four volts DC as the P wire current ranges from zero to one half ampere.

Any signal above one half ampere in the P wire is a propulsion signal and therefore it is meaningless to the braking unit. A brake transfer relay separates the entire braking system from the magnetic amplifier when an input voltage of slightly higher than four volts is reached, and applies a relatively high output voltage in its place. The brake transfer relay transfers the braking unit input to a fixed voltage of four volts as the P wire exceeds 0.5 ampere. As current in the P wire drops below 0.5 ampere the relay drops out and the braking system then tracks with current in the P wire, in terms of rectified control voltage in the range 0 to 4 v. at the output of the amplifier.

The output of the magnetic amplifier, after rectification, to produce a control voltage, charges a control capacitor through a charge rate limiting resistance. Thereby a step change of current in the P wire will not instantaneously change the charge on the capacitor, since a time constant is involved in the charging or discharging function. The braking unit can therefore follow the voltage across the capacitor, and will not seek to apply a step function to the system. The voltage on the capacitor is introduced to an operational amplifier, the output of which is a power amplifier.

When in the A & R mode, the system, with the exception of the magnetic amplifier and its normal concomitants, is completely isolated from the P wire. The A and R operation is accomplished by two relays designated AR and RR for application and release relays. The control capacitor is connected through the normally closed contacts to ground on the A relay and normally open contact of the RR relay to a relatively high positive voltage, say 20 volts. By energizing the A relay the capacitor is disconnected from ground. The voltage level on the control capacitor is then determined by the length of time that the R relay is energized. Leaving the A and R relays energized holds 20 volts on the control capacitor and thus the brakes are maintained released. By de-energizing the A and R relays the capacitor will be grounded through a resistance, and by energizing the A relay before the capacitor reaches zero the voltage across the capacitor will hold at a specific level. With both relays de-energized full brakes will be called for. The gain of power amplifier above referred to is different only due to the values of control voltage used in the A and R mode of operation and other than in respect to the differences called for in the present paragraph system, functions precisely as in the P wire mode.

The operational amplifier signal, during P mode operation, is modified according to the load of the car being braked. Two transducers are located at opposite corners of the car. This provides an average load sensing situation. The transducers utilize a five kilohm potentiometer which delivers, when in an empty car situation approximately 26% of the voltage across the potentiometer. As the car's weight increases with load the percentage of the voltage increases up to a full load condition of 51% of the applied voltage.

If the load of the car should exceed full load and therefore have a load corresponding with more than 51% of the applied voltage, an overload condition is indicated by indicator lamps on the control chassis of the system. The braking effort on overload is no greater than for a full load, and therefore the overload is indicated but not fully compensated. A summing amplifier sums the called for braking signal with the weight correction signal and the called for braking signal is therefore automatically modified according to the load of the car. The modified braking signal actuates the external dynamic brake control equipment. A dynamic brake feedback signal which is dynamic brake current transduced into a calibrated voltage proportional to dynamic brake effort is externally applied to the amplifier 44. This is compared to the called for braking signal and if necessary friction brake is added in order to supply the desired braking effort.

In order to test dynamic brake blending when the car is standing still, a dynamic simulator circuit is included.

This allows a manual adjustment to simulate the amount of dynamic brake available.

Having modified control signal in accordance with load condition and the available dynamic brake, control or error voltage is now used to control the frictional brakes directly, by controlling current flow to the brake motors. This is accomplished by an error amplifier, power transformers and a feedback control. The error amplifier drives the power amplifiers on and as the current output increases feedback voltage is created across a feedback resistor in series with the voltage, thus assuring desired current flow. The torque of the motors is proportioned to the current, therefore control of current controls the amount of applied brake, zero current equaling full brake.

For the present system to be a proportional braking system, all parts of the system must respond to very small input changes. It was found that due to various sources of static friction, the torque motors would not respond to selectively small changes in current. To overcome this difficulty a jog circuit is provided which responds to very small signal changes and momentarily applies full battery voltage to the torque motor just long enough to overcome static friction. Once the motors are in motion, the motors will respond to very small changes in control signal.

It is, accordingly, a primary object of the present invention to provide a novel brake control system.

It is another object of the invention to provide a brake and propulsion control system operative in response to and as a direct function of control current and which operates in the braking mode for a range of control currents, all currents exceeding those in the range representing a propulsion condition.

A further object of the invention resides in the provision of a brake control system employing an electric motor for releasing brakes, wherein a jog circuit is employed to overcome static friction of the motor and its load.

It is another object of the invention to provide a brake system including a simulator to facilitate testing and adjustment of the system while the braked vehicle is stationary.

Another object of the invention resides in the provision of a braking system employing a signal current carrying line, and an electric motor actuated brake, wherein the line is electrically isolated from the control circuitry for the motor by means of a magnetic amplifier, responsive to the signal current.

Still another object of the invention resides in a novel relay control system, which pulls the relay in and drops the relay out at two distinct but closely spaced values of control signal.

The above and still further objects, features and attendant advantages of the present invention will become apparent from a consideration of the following detailed description of a preferred embodiment thereof, especially when taken in conjunction with the accompanying drawings, in which:

Figure 1A:
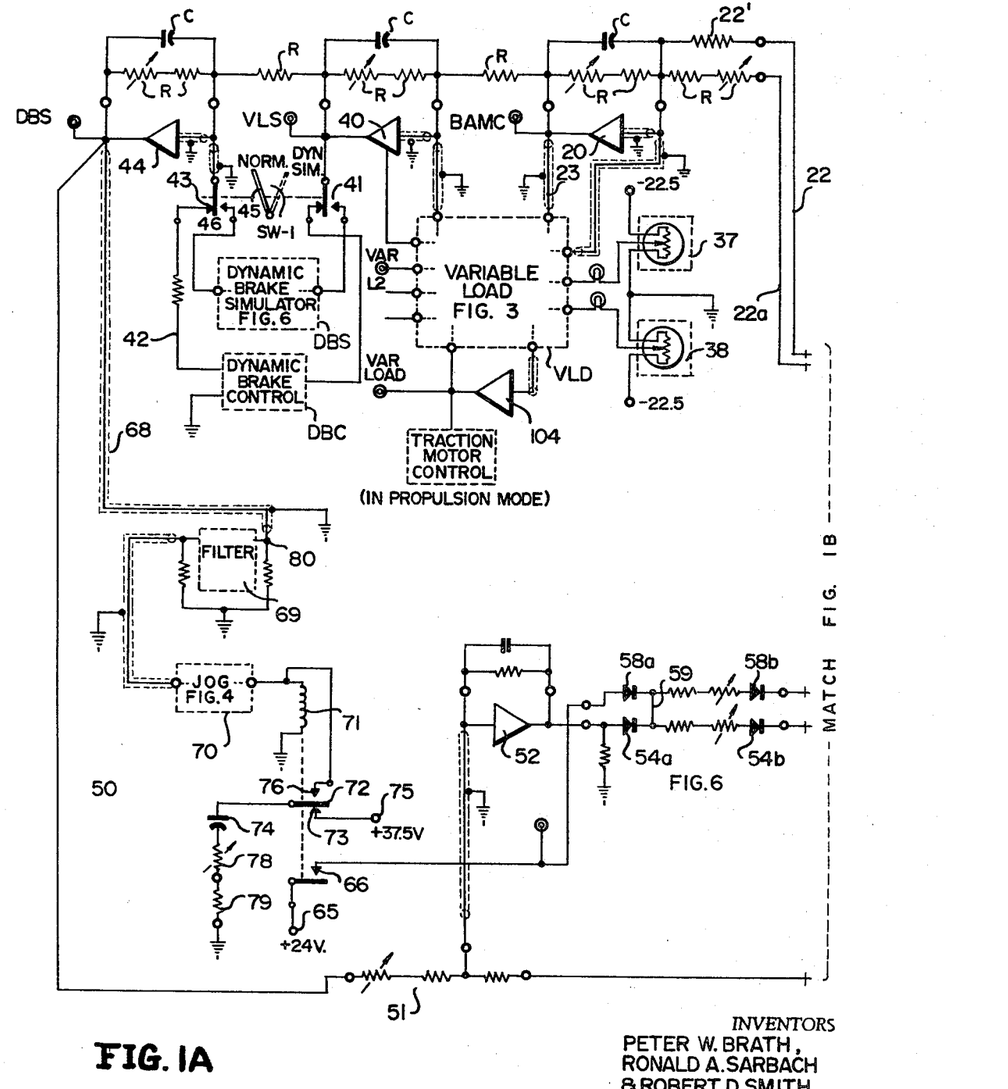
FIGURES 1A and 1B is a diagram, partly schematic and partly in block form, of the system of the present invention.
Figure 1B:
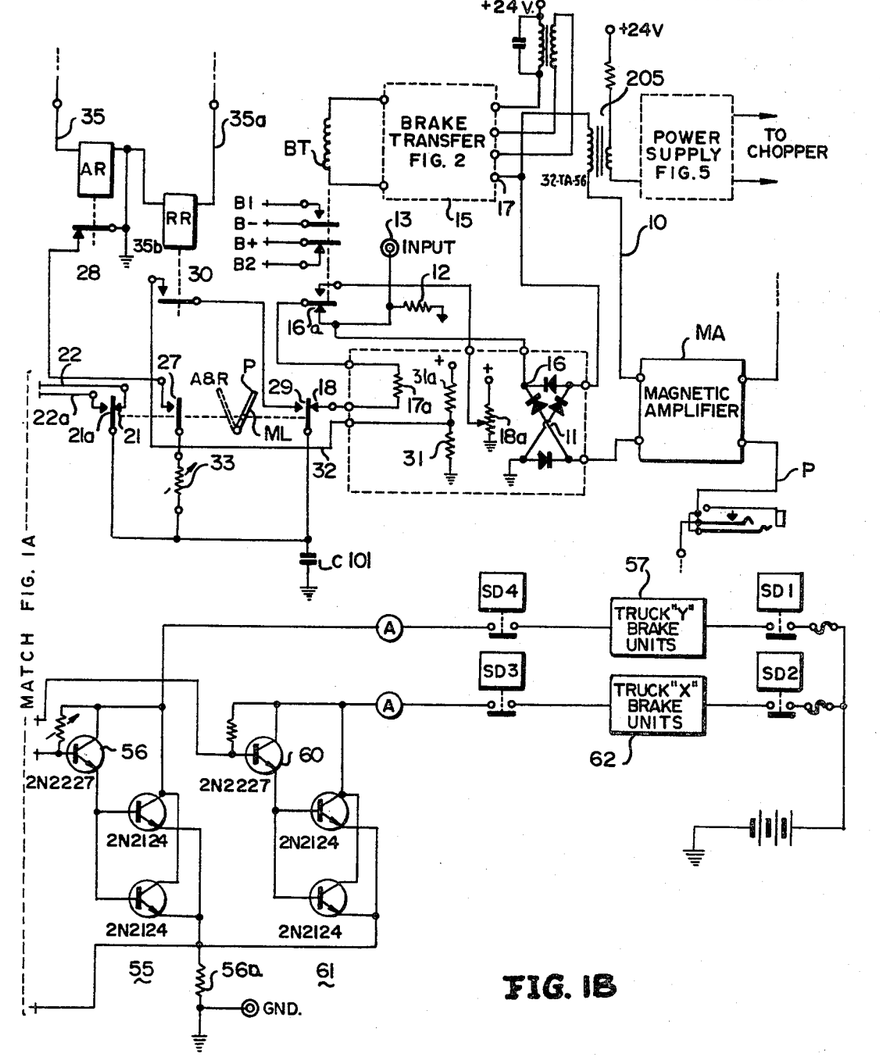

Referring now more particularly to the accompanying drawings, in FIGURE 1B, wire P is a conductor or wire carrying control current, hereinafter sometimes called control signal, running through the car or cars to which braking is to be applied. Control is continuous and proportional to current flow, and provides braking control when the current ranges between zero and 0.5 amp. In the range 0.5 to 1.0 amp the control calls for propulsion. Current in conductor P controls output of a magnetic amplifier MA. The latter, as is conventional, contains a core (not shown) which tends to saturate as current in the P wire increases, and thus reduces the inductive reactance of a secondary winding of the amplifier (not shown), which includes, in series, an A-C power supply lead 10, a rectifying bridge 11, and a 250 ohm load 12 in series with the latter. As the system is designed, in one embodiment, when the P wire has a magnitude of 0.5 amp, the load resistance 12 has a 64 mv. dissipation, or a 4 v. D.C. drop. This value can be monitored at terminal 13.

The brake transfer 15 transfers operation from brake to propulsion when a voltage of slightly more than 4 v. appears across resistance 12 and back to brake when the voltage is reduced to below 4 v.

In this respect, the voltage at point 16 of bridge 11 proportional to P wire current of .52 amp is supplied to terminal 17 of brake transfer 15, and acts as input or control. So long as this voltage is sufficiently great, as indicated by the fact that voltage at terminal 17 is indicative of .52 amp or above, on the P wire the brake transfer relay BT is held in. As the P wire current drops below .48 amp, the brake transfer relay BT drops out and the braking system then tracks with current in the P wire. The differential values of drop out and pull in currents assure that unstable operation cannot occur.

Brake transfer relay BT controls a normally closed and a normally open set of contacts which are connected respectively to terminals B+, B2, and B1, B—, which can provide exterior signal for indicating braking mode or propulsion mode of operation.

In the braking mode the voltage across resistance 12 is transferred via contacts 16a, resistance 17a, contacts 18 to capacitor C101, resistance 17a being a charge rate limiting resistance, to assure that step changes in P wire current will not instantaneously change the voltage across capacitor C101. In the propulsion mode the fixed voltage at the slider of potentiometer 18a is substituted for the variable voltage across resistance 12.

The voltage at C101 is applied to an operational amplifier 20 (FIGURE 1A) via contacts 21 and line 22 and resistor 22'. The output of operational amplifier 20 is available at monitoring terminal BAMC, and for application to variable load VLD, via cable 23.

A and R operation involves isolation of the system from the P wire, with the exception of magnetic amplifier MA. Application is accomplished by relay AR and release by relay RR. The respective P wire mode, A and R mode operations are selected by a manual lever ML, which is actuated to the left for A and R operation and to the right (FIGURE 1B) for P wire operation. In the A and R mode capacitor C101 is connected via contacts 27 and 28 to a ground at the AR relay, contacts 28 being normally closed, and via now closed contacts 29 to normally open contacts 30 of relay RR, and signal being transferred from capacitor C101 to amplifier 20 via line 22a and switch contacts 21a.

By energizing the AR relay, capacitor C101 is disconnected from ground. Energizing the RR relay applies a fixed voltage from divider 31, via line 32, contacts 30 and 29, to capacitor C101, causing same to charge at a predetermined rate controlled by the value of resistor 31a. The voltage level of C101 is determined by the length of time the RR relay is energized. Leaving A and R relays energized will hold 20 v. on capacitor C101, which leaves the brakes released. De-energizing the AR and RR relays grounds capacitor C101 through resistance 33, effecting a timed discharge. By energizing AR before the voltage across capacitor C101 reaches zero, the braking level then obtaining will hold. The AR and RR relays are connected to respective control lines 35 and 35a with a common ground for application of control signal to the relays.

The output of amplifier 20 is modified, in the variable load VLD, according to the weight carried on the car. Two transducers, 37 and 38, are located at opposite corners of the car, to provide an average load sensing situation. The transducers utilize 5K ohm potentiometers, which deliver, when in the empty car situation, approximately 26% of the voltage across the potentiometer. As the weight of the load on the car increases, the percentage of the voltage also increases up to a full load condition at 51% of applied voltage. An overload condition does not further increase the latter percentage, and is not compensated for. The output of variable load device VLD is applied to amplifier 40, to which is also applied the output of amplifier 20, so that at the output of amplifier 40, which can be monitored at terminal VLS, the brake signal has been modified according to car load.

The output of amplifier 40, via contacts 41, supplies control current to a dynamic brake control DBC, and a feedback signal is applied via lead 42 and contacts 43 to the input of amplifier 44, representing the available dynamic braking force. To the latter is also applied the output of amplifier 40, so that the input to amplifier 44 is a summary signal, calling for release of friction brake either by the normal release method or by reason of the dynamic brake force developed. Excessive brake is thus avoided by modifying the friction brake signal in proportion to effectiveness of dynamic brake. This signal may be monitored at terminal DBS.

In order to test the dynamic brake blending system when the car is standing still, a dynamic brake simulator DBS is provided. This allows a manual adjustment to simulate the amount of dynamic brake available. Switch SW-1 sets the mode to either Normal Operation, when arm 45 is in its left position, or to Simulator Operation when arm 45 is in its right-hand position, since in the latter position contacts 46, 47 connect DBS in place of dynamic brake control DBC.

The control signal has now been modified with load conditions and available dynamic brake, and is used to control friction brakes directly. The signal at terminal DBS is applied via line 50, and through voltage divider 51 to the input of error signal amplifier 52. The error signal is positive, and proceeds via diodes 54a and 54b to power transistors 55. 56 is an NPN driver transistor, which supplies current via its emitter to the bases of transistors 55, in parallel. Transistors 55 are NPN transistors, having an emitter bias resistance 56a, and a collector load. This load is, for transistors 55, truck Y brake units, 57, which constitute electric torque motors. These release brakes, when energized, the brakes being applied by spring pressure upon reduction from normal current energizing the torque motors. Diode 54a transfers signal into diode 58b, via shorting lead 59, and diode 58b provides drive signal to NPN transistor 60, which in turn drives power transistors 61, in parallel and these supply current to truck X brake units 62.

Amplifier 52 drives power amplifiers 55 and 61 on, and as the current output increases a feedback voltage is created across resistance 56a in series with the motors, thus ensuring desired current flow. The torque of the motors is proportional to the current, therefore control of current controls amount of applied brake, zero current equaling full brake and full current equaling zero brake.

For the present system to be a truly proportional braking system, the system, in all its component parts, must respond to very small input changes. Sources of static friction exist, however, so that the torque motors do not respond to very small current changes. To overcome this difficulty a jog circuit is provided, which momentarily applies full battery voltage to the torque motor, in response to very small signals, for a time just long enough to overcome static friction. This voltage derives from a terminal 65, which supplies +24 v. to diode 58a, and thereby to diodes 58b and 54b and to the power amplifiers 55 and 61, while and only while contacts 66 are closed.

Figure 4:
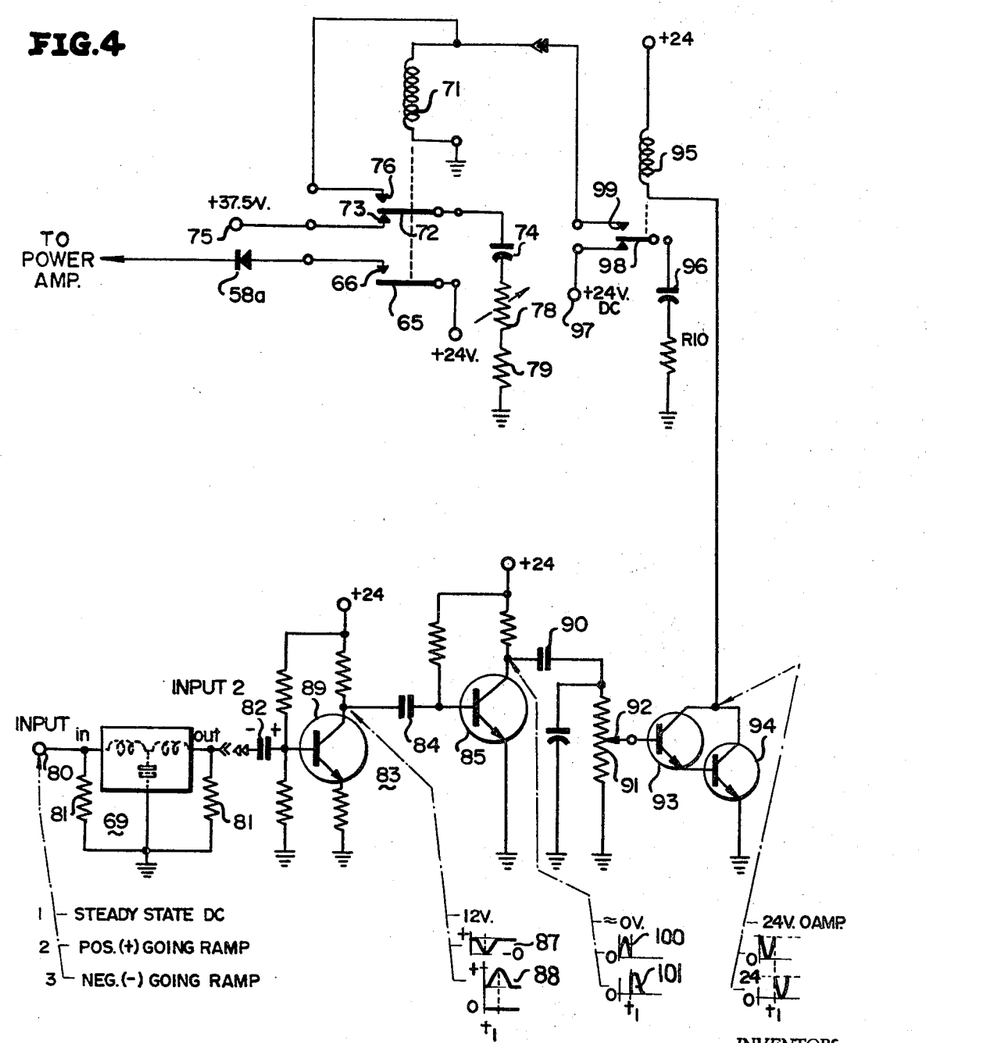
FIGURE 4 is a schematic circuit diagram of a jog circuit, utilized in the system of FIGURES 1 and 2.
Figure 5:
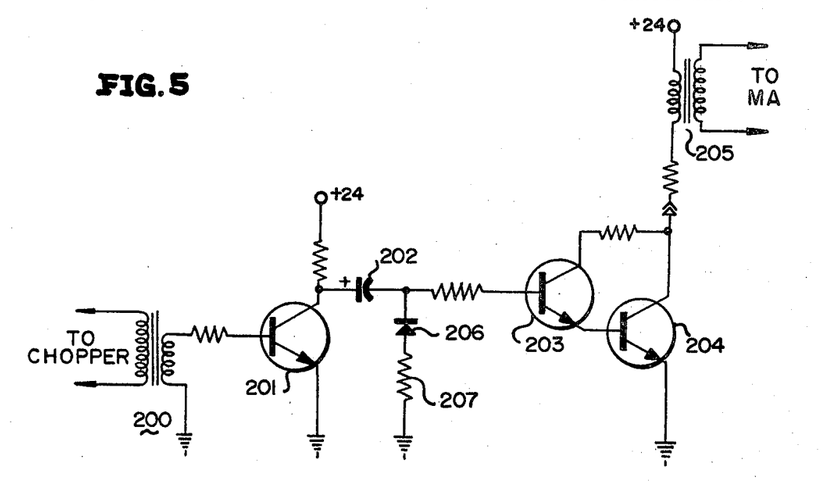
FIGURE 5 is a schematic circuit diagram of a power supply for the magnetic amplifier of FIGURES 1A and 1B, illustrated in block form in FIGURES 1A and 1B.
Figure 6:
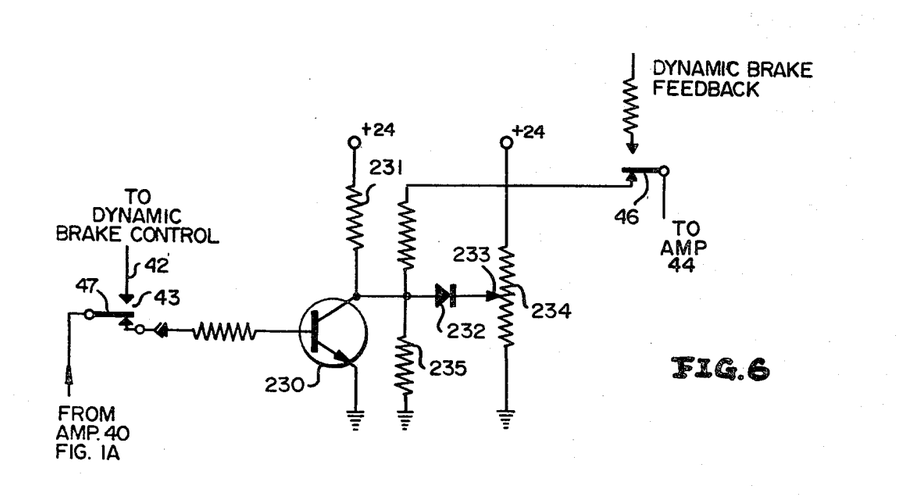
FIGURE 6 is a circuit diagram of a dynamic brake simulator, illustrated in block form in FIGURES 1A and 1B.

In operation, output signal from amplifier 44 proceeds via line 68 and low pass filter 69, to the jog circuit 70, shown in detail in FIGURE 4. The latter supplies current to relay 71, causing it to pull up. The armature 72 of relay 71 is normally at contact 73 and provides a positive voltage, 37.5 v., charging circuit for capacitor 74, from terminal 75, current from jog circuit 70 into relay 71 being also a positive pulse, but about 24 v. When relay 71 pulls up to contact 76, the capacitor discharges through relay 71, causing a transient situation, until the capacitor has discharged. The capacitor 74 then recharges via contact 73 and armature 72 in readiness for a succeeding operation. Resistances 78 and 79 provide a time constant on charge and discharge, so that chattering will not occur.

The signal supplied by the jog circuit from terminal 65 is a full 24 v. and therefore drives the power amplifiers 55 and 61 hard, albeit momentarily, to effect jog movement of the torque motors of brake units 57 and 62.

SD1, SD2, SD3 and SD4 are switches or circuit breakers, in the lines of brake units 57 and 62, A being ammeters which indicate current in these lines. In FIGURE 1A, resistances R shunting the several amplifiers 20, 40, 44 are utilized to adjust gain so that required output levels will be attained, and it will be noted that input lines 22, 22a, which apply signal at diverse levels, respectively, are differently provided with resistance. Capacitors C are utilized as filters to bypass noise.

Referring now to FIGURE 4 of the drawings, which illustrates the jog circuit 70, the signal input which is required to control the friction brakes of the system, is applied to terminal 80. To this terminal may be applied either (1) a steady state DC signal, or, (2) a positively going ramp, or, (3) a negatively going ramp, depending on the character of the signal. The signal passes through the low pass filter 69, the details of which are unimportant and which is per se conventional. The filter is terminated at both input and output by impedance matching resistances 81. The filter is of the LC type, and leads to a series blocking capacitor 82, so that steady DC signals are blocked and only signal variations (2) and (3) pass, the variations being amplified by amplifier 83, and modified by capacitor 82. The amplified signal passes through series capacitor 84 and is applied to the base of NPN transistor 85.

The outputs of amplifier 83, for the cases of positively and negatively going ramps, are shown at 87 and 88, recalling that the amplifier 83 reverses polarity. The negative going input signal is sensed immediately, since the capacitor 82 is continuously charged by bias voltage existing between the base of transistor 89 and ground. A positively going input must exceed the voltage across the capacitor before the bias on the base of transistor 89 is affected, resulting in a delay.

The amplified signal passes through capacitor 84 to transistor 85, which is biased to the point of just beginning to turn off, so that a negative going signal is required to turn transistor 85 off and pass a pulse of current through capacitor 90 and resistance 91. A part of the voltage transiently existing across resistance 91 is picked off by slider 92, to turn on switching transistors 93, 94, and apply current to relay 95.

When relay 95 picks up, the voltage available across capacitor 96, provided from terminal 97 via normally closed contacts 98, is applied via contacts 99 to relay 71. This relay is thus caused to pick up transiently. Relay 71 is timed to drop out by capacitor 74 and resistances 78, 79, as hereinabove explained, i.e. the 24 volts available from capacitor C5 is only sufficient to pick up relay 71, which is then sustained by discharge of capacitor 74, at 37.5 v. until the latter has discharged to below the holding point for the relay.

It may be noted that the jog signal is always positive, this fact not implying, however, that static friction need be overcome only when brake motor torque must be increased to increase release of break. The purpose of the jog signal is to provide a shock to the motor to shake the motor loose and thus permit its control by brake signal. The bias of transsistor 85 at near turn off, and its control via capacitor 84, implies that a positive pulse signal, as 100 and 101, will appear at the collector of transistor 85, for input signal of either character, because either input signal contains as one of its components a voltage variation proceeding in such sense that in passing through capacitor 84 a decrease in current will occur in transistor 85 and therefore an increase in collector voltage. The position of slider 92 can be set to establish sensitivity of the system, i.e. so that the system will respond to input ramps of only desired combinations of slope and duration. The filter 69 participates in establishing sensitivity, in that very short term changes of error signal represent high frequencies, which do not pass the filter.

Figure 3:
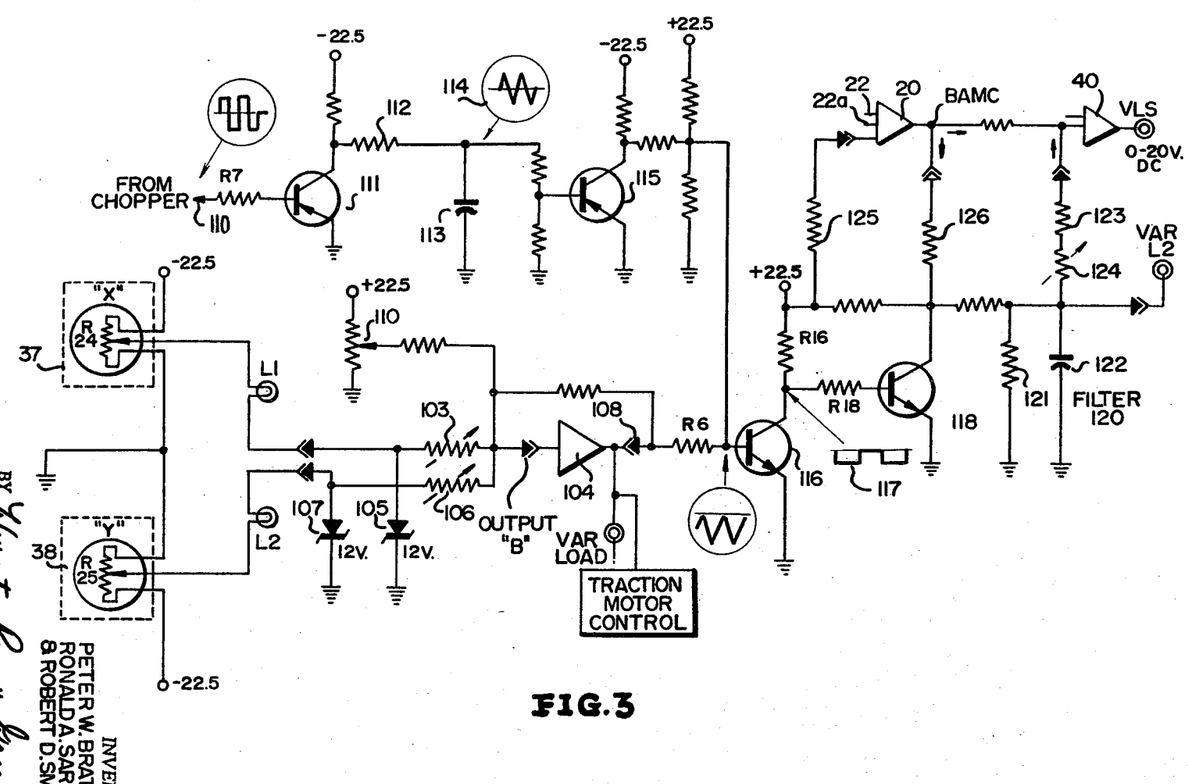
FIGURE 3 is a schematic circuit diagram of a variable load, included in block form in FIGURES 1A and 1B.

The variable load device VLD, FIGURE 1a, is illustrated in detail in FIGURE 3. It has been hereinabove recited that the variable load device weighs a car and modifies the braking signal continuously according to the load on the car, so that braking signal called for may be in terms of absolute deceleration for all car weights from fully unloaded to fully loaded. Overloaded cars are treated as fully loaded.

Transducers 37 and 38 provide voltages proportional to car weights, being placed at opposite corners of the car, to provide an average weighing function. Transducers 37 and 38 are pressure transducers.

Referring now to FIGURE 3 of the accompanying drawings, 37 and 38 are pressure transducers which have outputs varying according to pressure input. When the car is empty the potentiometers of the transducers have output of 27% of the full travel (5K ohms). When fully loaded this increases to approximately 52% of the full travel of the sliders of the potentiometers. Since the load readings of the potentiometers is a finite value, this must be balanced to zero, and in addition the weight representative signals must be limited to the value desired to represent full load, despite the fact that the car may be overloaded.

The output of transducer 37 proceeds through an indicator lamp L1 and through a variable weighting resistance 103 to an amplifier 104. The junction between lamp L1 and resistance 103 is passed to ground through a Zener diode 105 which breaks down at 12 volts. Similarly, the transducer 38 supplies its voltage through an indicator lamp L2 and a weighting resistance 106. Connected between the junction of indicator lamp L2 and weighting resistance 106 and ground is a Zener diode 107. Resistances 103 and 106 lead to the input of amplifier 104, the output of amplifier 104 occurring at terminal 108, and representing traction motor control in the propulsion mode. To the input of amplifier 104 is applied a variable positive voltage deriving from a potentiometer 110. The outputs of the transducers 37 and 38 are negative. The slider of the potentiometer 110 is set to balance out the voltages supplied by the transducers 37 and 38 at the input of the amplifier 104 for the zero load on the car. As the transducers increase to fully loaded condition the gain of amplifier 104 is adjusted through resistances 103 and 106 so that the voltage at output terminal 108 will be 20 volts at full load and zero when empty. The Zener diodes 105 and 107 when discharging, in conjunction with the lamps L1 and L2, give a visual indication of overload. If the transducers should exceed 12 volts output, the Zener diodes will break down and hold the amplifier at 12 volts input, and if the 12 volts should be exceeded the Zener diodes will conduct the excess current to ground. Excess voltage and currents due to breakdown of the Zener diodes causes the lamps L1 and L2 to glow and to indicate thereby an overloaded condition.

The unweighted brake signal appears at the output of amplifier 20. This signal must be modified in accordance with the signal at terminal 108 in order to obtain the required brake signal at terminal VLS from amplifier 40. This is done by means of a multiplier circuit now described.

The signal which emerges from the amplifier 20 has a range of values from −10 to −20 volts for application and release respectively. This signal passes to amplifier 40 and to the multiplier circuit where it is modified and passed to another input of amplifier 40. The output of amplifier 40 then becomes the load signal, providing zero outputs for full application and 20 volts for full release.

To the input terminal 110 is applied a square wave derived from an operational amplifier chopper (not shown). This square wave is amplified by transistor amplifier 111, of conventional character, having, however, at its output an integrated circuit composed of series resistance 112 and shunt capacitor 113. The voltage across the capacitor is then a triangular waveform as indicated at 114. Amplifier 115 amplifies the triangular waveform 144 and passes that waveform to the base of an NPN transistor 116, to which is also connected the terminal 108. Thereby, the triangular wave input deriving from amplifier 115 and the D.C. output deriving from terminal 108 are summed, the triangular wave riding on the D.C. input. The amplifier 116 is biased to a threshold, and is turned on by the triangular waves. The total time of turn-on depends on the D.C. level of the triangular waves, i.e. the transistor 116 is turned on for such times as the triangular wave is above the turn-on threshold and this time varies according to the level of the D.C. The output of transistor 116 is a variable pulse width square wave, 117, since the transistor 116 acts as a switch, and the waveform 117 is passed to the base of the transistor 118. Transistor 118 is normally conductive, but is turned off by the square wave to the full voltage which appears at its collector. This voltage is proportional to the output of the amplifier 20 and will range from values of zero to +10 volts for BAMC voltage of −20 and −10 volts, respectively. The resultant unfiltered output of amplifier 20 is a square wave whose amplitude is dependent on the braking signal and the width of which is dependent upon the load signal. This square wave is filtered by the filter 120, comprised of resistance 121 and capacitor 112, to remove the A.C. component of the signals. The remaining D.C. voltage is blended with the output of amplifier 20 representing BAMC signal at the input of amplifier 40, to give the weighted brake signal. The resistances 123, 124 connected in series between the filter 120 and the input of amplifier 40 serve to adjust the output of that amplifier so that it falls between the desired values of zero and 20 volts. The resistance 125 serves to provide supply voltage from terminal 126 to the amplifier 20. The resistance 126 adjusts the output of the amplifier 20 to a suitable value for application to the collector of NPN transistor 118.

It is essential to the operation of the present system that a brake transfer relay BT operate when the P wire current rises to a level of 0.52 ampere and drops out when the current in the P wire falls to 0.48 ampere. This is accomplished by the circuit of FIGURE 2.

Figure 2:
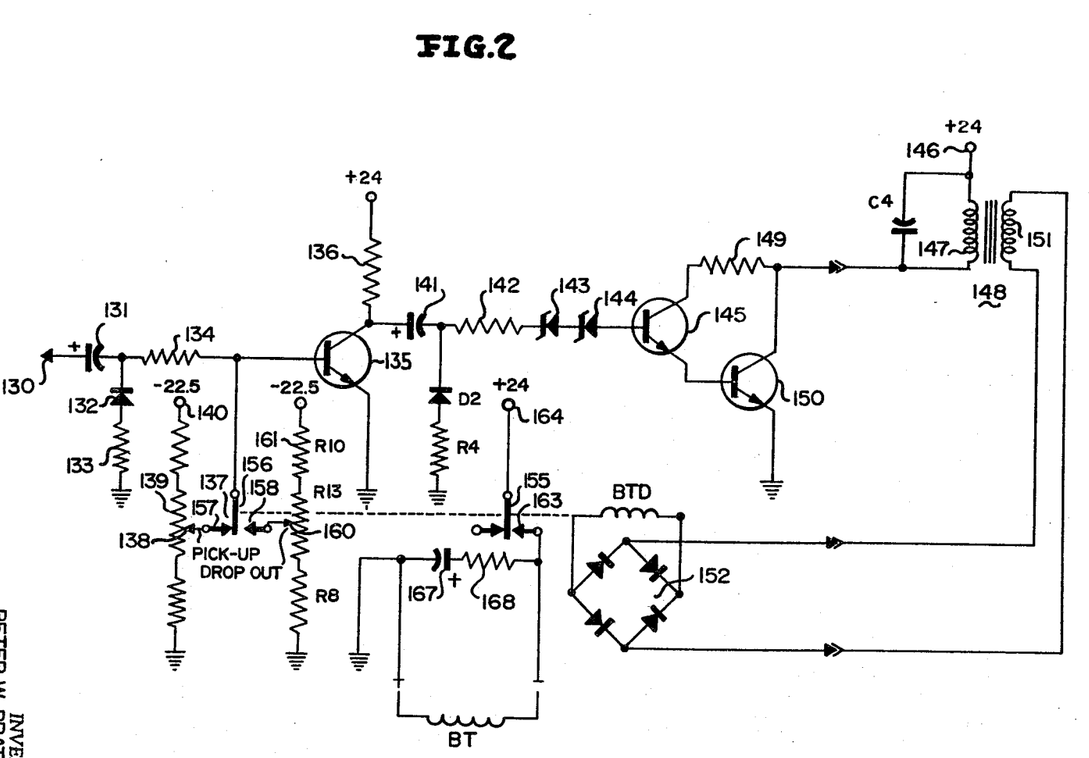
FIGURE 2 is a schematic circuit diagram of a brake transfer, included in block form in FIGURES 1A and 1B.

P wire current or a voltage proportional thereto is applied to the input terminal 130. This voltage passes through the capacitor 131 and is clipped by the diode 132 and series resistance 133 to remove negative going portions thereof. The positive portions of the input signal are applied through a resistance 134 to the base of an NPN transistor 135. The NPN transistor 135 has a grounded emitter and a collector load 136. The base of the transistor 135 is biased negatively by a voltage supply through switch 137 from slider 138 of potentiometer 139, having a negative voltage supply 140.

So long as the input signal does not overcome the bias provided from the slider 138, the transistor 135 will not turn on. The output of the transistor 135, at its collector, is passed on through a capacitor 141 through a resistance 142 to Zener diodes 143, 144 in series with each other, and to the base of an NPN transistor 145. The collector of the transistor 145 is connected to a positive voltage terminal 146 through a primary winding 147 of a transformer 148, and through a voltage dropping resistance 149. Connected from the high potential side of the resistance 149 is the collector of an NPN transistor 150, having its emitter grounded and its base connected directly to the emitter of the transistor 145. The transistor 145 is normally non-conductive and will not turn on until transistor 135 is driven nearly full on, due to the fact that the Zener diodes 143, 144 isolate the base of the transistor 145 from input current, until they are rendered conductive. When the transistor 135 becomes sufficiently conductive the Zener diodes 143, 144 conduct and the transistor 145 becomes conductive which in turn renders the transistor 150 conductive and the current passes through the primary winding 147. Accordingly, transistors T2 and T3 switch on and off with the magnetic amplifier output, providing a fail-safe voltage to the relay BTD, which is energized from the secondary winding 151 of transformer 148 through a rectifying bridge 152. Accordingly, the relay BTD is energized when current passes through transformer 148. When the BTD relay picks up it shifts the contacts of the armatures 155 and 156. In shifting the armature 156 from contact 157 to 158 the bias on the base of the transistor 135 is shifted since the contact 158 is connected to the slider 160 on the potentiometer 161, that slider having a different position than does the slider 138. Additionally, the armature 155 pulls to the right, completing a circuit to the contact 163 and thereby applying current from supply terminal 164 for the relay BT. The relay BT is a relatively heavy duty relay while the relay BTD is a sensitive relay. The condenser 167 and the resistance 168 connected across the relay BT prevents unstable operation of that relay on turn on or turn off thresholds. As the current in the P wire reduces to .48 ampere the BTD relay drops the input back to the higher negative bias insuring that the brake relay BT will drop out silently. The sliders 138 and 160 must be adjusted so that the BTD relay pulls in on .52 ampere, but drops out again when the P wire current falls to .48 ampere.

While we have disclosed a preferred embodiment of our invention, it will be apparent to those of ordinary skill in the art to which the invention pertains that variations in the specific details of construction, which have been illustrated and described, may be resorted to without departing from the spirit and scope of the invention as defined in the appended claims.

What we claim is:
1. A braking system for a vehicle, including
a wire having control current flow therein varying from zero to a predetermined level to effect proportional brake control and above that level to call for propulsion,
current at zero value calling for full brake and current at said predetermined level for zero brake,
a magnetic amplifier responsive to said current to provide output current in proportion to said control current flow,
a rectifier responsive to the output of said magnetic amplifier to produce a primary brake control voltage proportional to said current, and
resistive means responsive to said primary brake control voltage for controlling application of said brakes, wherein said magnetic amplifier is arranged and adapted to provide electrical isolation between said wire and said rectifier.

2. The combination according to claim 1 wherein is provided a brake transfer, said brake transfer being responsive only to values of said primary brake control voltage exceeding said predetermined level for substituting for said resistive means a source of primary brake control voltage providing at least said voltage level.

3. The combination according to claim 2 wherein is provided means for at will substituting an alternative source of said primary brake control voltage in place of said magnetic amplifier.

4. The combination according to claim 2 wherein is provided
means for weighing the load on said car and providing a weight control voltage representative of the weight on said load,
means for combining said primary brake control voltage with said weight control voltage to provide a secondary brake control voltage,
means responsive to said secondary brake control voltage for controlling application of dynamic brake for said car,
means for generating a further voltage representing amount of dynamic brake application, and
means responsive to said further voltage and said secondary brake control voltage for developing an error signal, and
means responsive to said error signal for controlling application of friction brake in such sense as to tend to reduce said error signal to zero.

5. The combination according to claim 4 wherein is further provided a jog circuit responsive only to variations of said error signal for applying relatively large but momentary values of said error signal to said last mentioned means.

6. The combination according to claim 5 wherein is further provided means for at will substituting for said further voltage an adjustable voltage simulating said further voltage.

7. The combination according to claim 1 wherein is provided means for at will substituting an alternative source of said primary brake control voltage in place of said magnetic amplifier.

8. The combination according to claim 1 wherein is provided
means for weighing the load on said car and providing a weight control voltage representative of the weight on said load,
means for combining said primary brake control voltage with said weight control voltage to provide a secondary brake control voltage,
means responsive to said secondary brake control voltage for controlling application of dynamic brake for said car,
means for generating a further voltage representing amount of dynamic brake application, and
means responsive to said further voltage and said secondary brake control voltage for developing an error signal, and
means responsive to said error signal for controlling application of friction brake in such sense as to tend to reduce said error signal to zero.

9. The combination according to claim 8 wherein is further provided a jog circuit responsive only by variations of said error signal for applying relatively large but momentary values of said error signal to said last mentioned means.

10. The combination according to claim 8 wherein is further provided means for at will substituting for said further voltage an adjustable voltage simulating said further voltage.

11. The combination according to claim 1, wherein said brakes are spring applied brakes and wherein is provided torque-motor means for releasing said brakes responsive to the output of said magnetic amplifier.

12. The combination according to claim 11, wherein is further provided jog circuitry operative only while said torque motor means is stationary for initiating operation of said torque motor means to effect brake release.

13. The combination according to claim 1 wherein is further provided means for modulating said control current flow according to the load on said vehicle.

14. The combination according to claim 1 wherein is further provided means for modulating said control current according to degree of dynamic braking applied to said vehicle, said braking system including a dynamic braking facility.

15. A braking system for a vehicle, including a wire having control signal therein varying from zero to a predetermined level to effect proportional brake control and above that level to call for propulsion, signal at zero level calling for full brake and signal at said predetermined level for zero brake, a power amplifier responsive to said signal to provide output current in proportion to said control signal, said brake being a spring applied tread brake which is torque motor released, and means applying said output current to said torque motor, said braking system including a dynamic brake means for modulating said control signal according to the load on said vehicle and according to the degree of dynamic braking applied by said dynamic brake.

16. The combination according to claim 15 wherein is further provided jog circuit means for initiating motion of said torque motor to effect brake release.

17. The combination according to claim 15 wherein is further provided means for modulating said signal according to load on said vehicle.

References Cited
UNITED STATES PATENTS 3,118,707  1/1964  Simmons et al. _______ 303—22

DUANE A. REGER, *Primary Examiner.*